Dec. 11, 1934. B. KOZMER Re. 19,393

APPARATUS FOR TREATING FOOTBALLS, BASKET BALLS, OR LIKE INFLATABLE BALLS

Original Filed April 25, 1931 2 Sheets-Sheet 1

Inventor
B. Kozmer

By B. Pelechowicz
Atty.

Dec. 11, 1934. B. KOZMER Re. 19,393
APPARATUS FOR TREATING FOOTBALLS, BASKET BALLS, OR LIKE INFLATABLE BALLS
Original Filed April 25, 1931 2 Sheets-Sheet 2
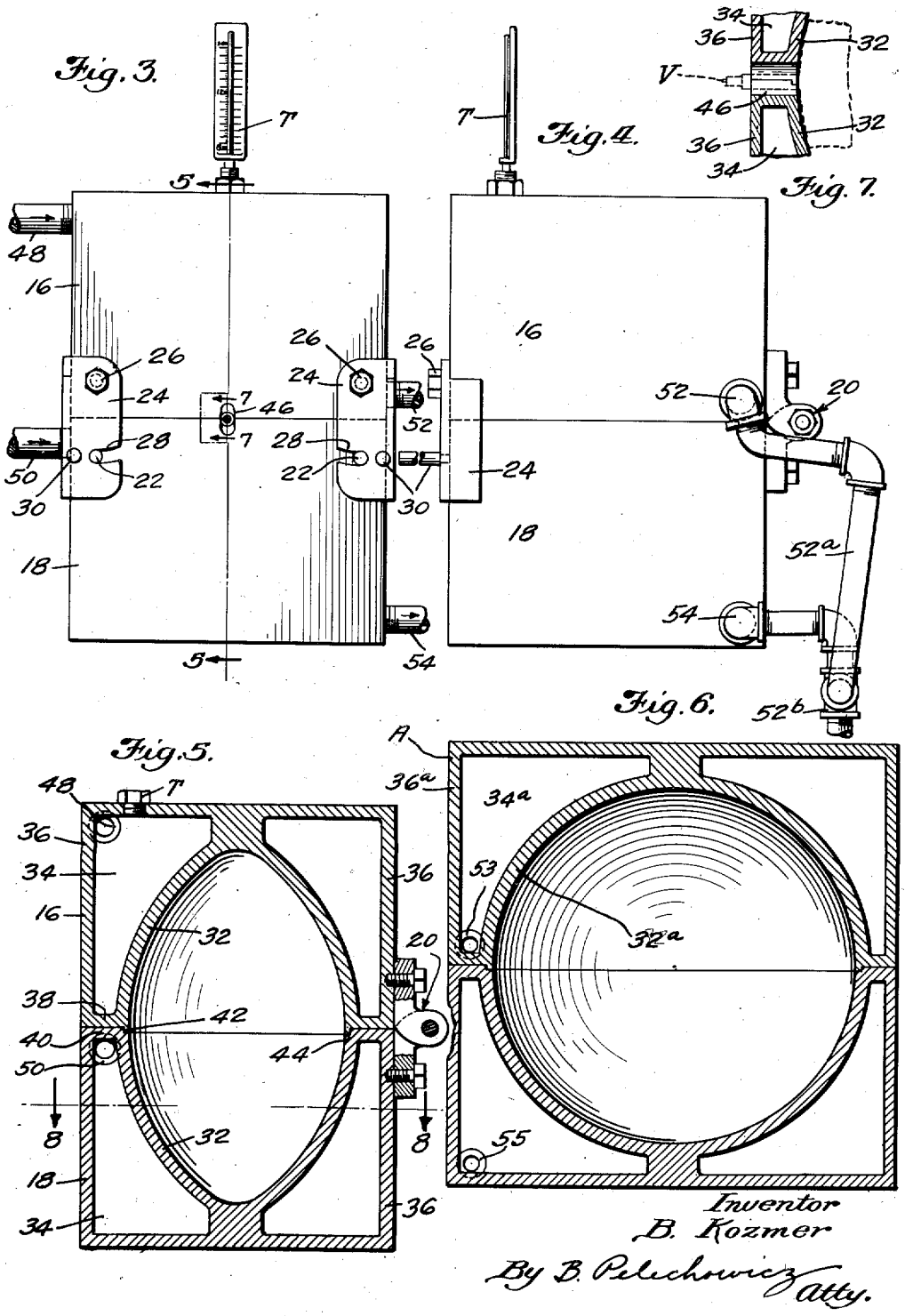

Reissued Dec. 11, 1934

Re. 19,393

UNITED STATES PATENT OFFICE 19,393

APPARATUS FOR TREATING FOOTBALLS, BASKET BALLS, OR LIKE INFLATABLE BALLS

Benjamin Kozmer, Chicago, Ill.

Original No. 1,938,913, dated December 12, 1933, Serial No. 532,823, April 25, 1931. Application for reissue October 5, 1934, Serial No. 747,110

9 Claims. (Cl. 69—1)

My invention relates to a new and useful method and apparatus for treating footballs, basketballs, rugby, soccer and similar inflatable balls of the type wherein a rubber bladder is employed, protected or enclosed by a leather casing or envelope.

As is well known in the art, balls of this type before they meet the approval of the schools, colleges, athletic associations and game officials must meet certain requirements as to shape, size, weight, etc. For example, a standard basketball must be 12″ in diameter of a definite weight, and be filled with a certain amount of air. Likewise a standard football must be oval shaped, of a definite size both in length and breadth and must contain a definite amount of air during use.

One of the problems of the past has been to manufacture these balls so that they conform accurately to these requirements particularly as to size and shape.

In manufacturing the cover or casing for the ball, which is ordinarily made of leather, the strips of leather are sewed together with the seam extending inwardly to form the hollow sphere with a smooth outer face. It frequently happens, however, that when a bladder is placed inside of the leather casing and air is pumped into the bladder to bring the ball to its round final shape, it is found that the finished ball is not spherical. A bulge here and a depression there, due sometimes to imperfect matching of the pieces of leather or due to inherent defects in the leather or to other causes, are some of the defects in a finished ball that make the ball imperfect in shape, hence, totally unfit for use.

The only available method for treating such balls in the past was by hammering the balls with mallets or bouncing them first on one spot of their surface and then on another in an effort to make them more nearly round by this rather dubious treatment. The only result of such treatment was rather to break down and weaken the leather to a greater extent.

An object of my invention is to provide a novel method for shaping balls.

A further object is to provide a method whereby a ball may be shaped by being placed within a definitely shaped mold.

A further object is to provide new and improved apparatus for shaping balls of the type specified.

A further object is to provide a method whereby a ball may be shaped by applying pressure from within and heat about its exterior surface to render the leather soft and pliable.

A further object is to provide apparatus for shaping balls that is comparatively simple in construction and operation and by the use of which the balls may be easily and quickly shaped with absolute accuracy.

Other objects and advantages will be more clearly understood as the description progresses. Reference is had to the accompanying drawings in which Fig. 1 is a plan view of the apparatus with the reservoir removed;

Fig. 3 is an enlarged front elevational view of one of the split molding units;

Fig. 4 is a side elevational view thereof;

Fig. 5 is a vertical sectional view taken on the line 5—5 of Fig. 3.

Fig. 6 is a similar sectional view of a modified form of molding unit taken on the line 6—6 of Fig. 2;

Fig. 7 is a fragmentary sectional view taken on the line 7—7 of Fig. 3 and;

Figure 1:
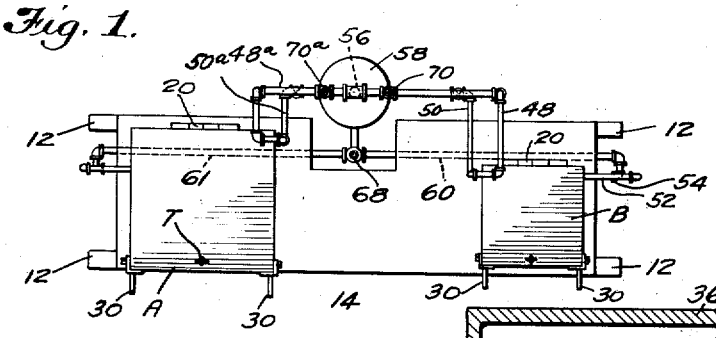
Figure 2:
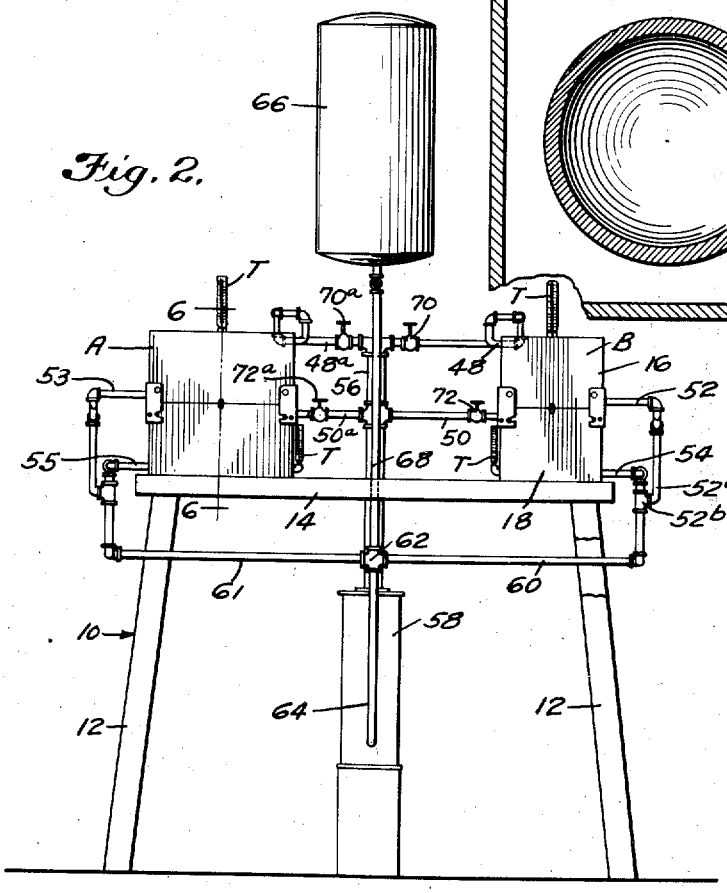
Fig. 2 is a front elevational view thereof.
Figure 8:
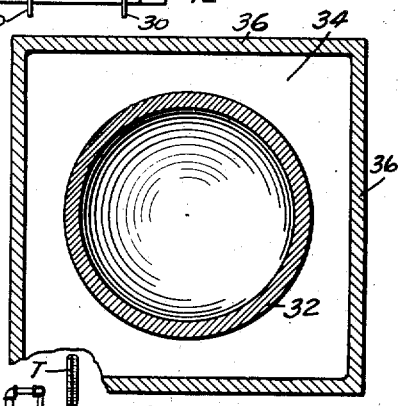
Fig. 8 is a plan sectional view through one of the lower molding units taken on the line 8—8 of Fig. 5.

As most plainly shown in Figs. 1 and 2 the apparatus comprises a base member 10 provided with suitable legs 12 which support a platform 14 upon which the molding units A and B are placed.

The platform 14 is preferably at a sufficient height that the molding units may be easily accessible to a person standing in front of the apparatus.

In the drawings I have illustrated two different molding units, one for molding elliptically shaped objects, such as footballs and the other for molding spherically shaped objects such as basketballs, soccer balls, etc. In view of the fact that these different molding units are identical in mode of operation and in all respects except the interior contour of the mold, only the mold for footballs will be described in detail.

The mold A comprises a pair of split sections 16 and 18 pivotally connected together at their rear upon a hinge member 20. A pair of stationary pin members 22 are secured to the front wall of lower section 18 and a pair of latch members 24 are pivotally mounted upon suitable bolts 26 upon the front wall of section 16. Each of the latches 24 has an arcuate open-mouthed slot 28 which is adapted to receive the pin member 22 to securely lock the units 16 and 18 together. Each of the latch members 24 is further provided with an outwardly extending handle 30 whereby the latches may easily be grasped to be moved to an open or closed position.

As clearly shown in Fig. 5 each of the sections 16 and 18 comprises a hollow casting having an inner wall 32 shaped to form a semi-elliptical cavity. Each of the walls 32 is comparatively thin and a chamber 34 is formed between the walls 32 and the outer walls 36 of the section. A pair of meeting walls 38 and 40 are formed into the two sections, the wall 38 having a circular projecting lip 42 and the wall 40 having a complementary counterbore 44 into which the lip 42 seats when the sections are fastened together.

In carrying out my process I place a partially inflated football into the semi-elliptical socket 32 of the lower section 18 and bring the sections together and lock them by means of latches 24 and pins 22. In this way a mold corresponding to the exact size of a football is provided. Means for allowing the valve of the football to protrude from the mold must be provided and accordingly I provide an elongated openig 46 formed partially in section 16 and partially in section 18 through which the valve may extend. Thus a football may be placed in the mold and a pump connected to the valve, and air under a high pressure may be pumped into the football bladder. I have found that a maximum of 150 pounds of air is sufficient to force the leather casing or covering against the walls 32 of the mold to allow the leather to be shaped to the exact interior contour of the mold.

In carrying out my invention I desire to provide a continuous flow of hot water within chambers 34. Accordingly I provide inlet conduits 48 and 50 into the upper end of the chambers 34 of the sections 16 and 18 and outlet or return conduits 52 and 54 extending from adjacent the lower ends of the chambers, said latter conduits being at sides of said sections which are opposite from those to which conduits 48 and 50 connect. Both conduits 48 and 50 extend in a standpipe 56 extending from the upper end of a water heater 58 and both return conduits 52 and 54 communicate with a conduit 60 which extends to a four-way connection 62 of a return conduit 64. The conduit 64 enters the lower end of the heater 58.

It can readily be seen that a circulation of heated water is effected from heater 58 through standpipe 56 and conduits 48 and 50 and return conduits 52, 54 and 60. To provide at all times a sufficient supply of hot water a reservoir 66 is provided having a conduit 68 extending downwardly therefrom and communicating with the return conduit 64 by means of the four-way connection 62.

Although connecting the inlet conduits 48 and 50 to the upper ends of chambers 34 of sections 16 and 18 and of the outlet conduits 52 and 54 to the lower ends of said chambers is preferable, as insuring the most perfect circulation of water within said chambers, it is nevertheless to be understood that good results will be obtained and a fairly uniform circulation of water and heat will be had when both inlet conduits 48 and 50 and outlet conduits 52 and 54 are connected to chambers 34 of sections 16 and 18 at the lower ends thereof. Since it is a well-known physical fact that warmer water seeks higher levels, the water in chambers 34 of sections 16 and 18 would circulate within said chambers and uniformly heat the inner walls 32 and 32*a*, as the case may be, notwithstanding that the inlet and outlet conduits connected to each of said sections 16 and 18 may be at the same level.

Suitable valves 70 and 72 are provided in the inlet conduits 48 and 50 so that the supply of hot water to either of the chambers may be properly regulated. A thermometer T is provided for each chamber 34 being suitably connected thereto in any well known manner.

Since it is desired to provide a construction wherein hot water is available to the chamber of upper section 16 a swivel connection must be provided in the conduit 52, consequently the pipe 52 engages in a suitable tapped opening in wall 36 of upper section 16, and when the section is swung open upon the hinge 20 the conduit will become slightly unscrewed. Since this action only unscrews the conduit approximately ¼ of a turn during the opening movement and because the water is under no appreciable pressure this action is not sufficient to cause any leakage at the connection. I have also found that a suitable swivel connection may be formed by producing a similar action between the portion 52*a* of conduit 50 and the T member 52*b* whereby the conduit 52 is connected to the conduit 60. A similar connection is required in the conduit 48 and its connection with the upper section 16.

As clearly shown in Fig. 2 pipe lines 48*a* and 50*a* enter the upper ends of the sections of molding unit A. Similarly conduits 53 and 55 extend from the lower ends of the units and connect with a return conduit 61 which connects with the four-way unit 62. Suitable valves 70*a* and 72*a* are likewise provided to regulate the flow of hot water to the sections of the molding unit A.

In Fig. 6 I have illustrated in cross sectional view the internal wall 32*a* of the basketball molding unit A. As can clearly be seen the wall has a chamber 34*a* surrounding same and an external wall 36*a*, which is similar in all respects to the football molding unit B.

The purpose of providing a continuous circulation of hot water around the molding walls is to allow heat to be inducted into the leather casing for the ball. This heat serves to render the leather much more pliable, and consequently assists in forming the casing to the exact shape of the mold.

I have found by actual experiments that by placing 100 to 150 pounds of air pressure in the ball and allowing a circulation of water of a temperature of 120° that the average ball with the usual grade of leather such as used in manufacturing these balls, may be properly and perfectly shaped by remaining in the mold from 2 to 3 minutes. Thus it can be seen that I have provided a very effective and efficient method for shaping balls of this type. The apparatus is capable of shaping balls continuously at a rate of speed heretofore found impossible and each ball that has been shaped is necessarily and absolutely perfect in exterior contour.

The invention is capable of wide variation, and I do not wish to be limited to the exact details shown; rather what I desire to secure and protect by Letters Patent of the United States is:

1. Apparatus for treating, forming or shaping leather covered inflatable balls comprising a split mold unit having two sections, the sections when closed providing a forming chamber therein of the exact desired size of the balls, said sections having outer walls spaced from the walls of said forming chamber, means for circulating hot water in the space around said forming chamber, said sections being hinged together on one side and having means on an opposite side for locking said sections in a closed position, said means comprising a pair of latch members pivotally mounted on one section having arcuately shaped open-mouthed slots formed therein and a pair of complementary pins secured to the other section for engagement therein.

2. Apparatus for treating, forming or shaping leather covered inflatable balls comprising a split mold unit having two sections, the sections when closed providing a forming chamber therein of the exact desired size of the balls, a passageway for a ball valve extending from said chamber medially between said sections, said sections having outer walls spaced from the walls of said forming chamber, means for circulating hot water in the space around said forming chamber, said sections being hinged together on one side and having means on an opposite side for locking said sections in a closed position, said means comprising a pair of latch members pivotally mounted on one section having arcuately shaped open-mouthed slots formed therein and a pair of complementary pins secured to the other section for engagement therein.

3. An apparatus for treating, forming or shaping an inflatable ball, comprising a pair of identically constructed complementary sections hingedly connected at one side, latch means at the opposite side of the sections for holding the latter fixed relatively in operative association, each section including an inner wall corresponding in shape to one-half of the outline of the ball to be treated, and an outer wall spaced from said inner wall and defining a heat receiving chamber completely surrounding said inner wall, and a connecting wall between the adjacent edges of said inner and outer walls, a shoulder formed on the inner wall of one section, and a depending lip carried by the inner wall of the other section to engage said shoulders when said sections are associated.

4. An apparatus for treating, forming or shaping an inflatable ball, comprising a pair of complementary sections, each section including an inner wall corresponding in shape to one-half of the outline of the ball to be treated, an outer wall spaced from said inner wall and defining a heating chamber completely surrounding said inner wall, inlet conduits connecting with the upper ends of said sections, outlet conduits connecting with the lower ends of said sections, and a heat generating source, the other ends of both series of said conduits connecting with said heat generating source.

5. An apparatus for treating, forming or shaping an inflatable ball, comprising a pair of identically constructed complementary lower and upper sections hingedly connected at one side, each section including an inner wall corresponding in shape to one-half of the outline of the ball to be treated, an outer wall spaced from said inner wall and defining a heating chamber completely surrounding said inner wall in each section, inlet conduits connecting with said sections at the upper ends thereof, outlet conduits connecting with the lower ends of said sections, a heat generating source with which the opposite ends of boh series of conduits connect, and swivel connections in the inlet and outlet conduits cooperating with the upper section permitting angular shifting motion of said upper section with respect to the lower section upon the hinge.

6. An apparatus for treating, forming or shaping an inflatable ball, comprising a pair of identically constructed complementary lower and upper sections hingedly connected at one side, each section including an inner wall corresponding in shape to one-half of the outline of the ball to be treated, an outer wall spaced from said inner wall and defining a heating chamber completely surrounding said inner wall in each section, inlet conduits connecting with said sections at the upper ends thereof, outlet conduits connecting with the lower ends of said sections, a heat generating source with which the opposite ends of both series of conduits connect, and non-rigid means in the inlet and outlet conduits cooperating with the upper section for permitting angular shifting movement of said section with respect to the lower section upon the hinge.

7. An apparatus for treating, forming or shaping an inflatable ball, comprising a pair of identically constructed complementary lower and upper sections hingedly connected at one side, each section including an inner wall corresponding in shape to one-half of the outline of the ball to be treated, an outer wall spaced from said inner wall and defining a heating chamber completely surrounding said inner wall in each section, inlet conduits connecting with said sections at the upper ends thereof, outlet conduits connecting with the lower ends of said sections, a heat generating source with which the opposite ends of both series of conduits connect, and means in the inlet and outlet conduits connecting with the upper section permitting unimpeded heat circulation therethrough even at the time of shifting of said upper section with respect to the lower section upon the hinge connection therebetween.

8. On apparatus for treating, forming or shaping an inflatable ball, comprising a pair of identically constructed complementary lower and upper sections hingedly connected at one side, each section including an inner wall corresponding in shape to one-half of the outline of the ball to be treated, an outer wall spaced from said inner wall and defining a heating chamber completely surrounding said inner wall in each section, inlet conduits connecting with said sections at the upper ends thereof, outlet conduits connecting with the lower ends of said sections, a heat generating source with which the opposite ends of both series of conduits connect, means in the inlet and outlet conduits connecting with the upper section permitting unimpeded heat circulation therethrough even at the time of shifting of said upper section with respect to the lower section upon the hinge connection therebetween, and means at said inlet conduit regulating the flow of heat.

9. An apparatus for treating, forming or shaping an inflatable ball, comprising a pair of complementary sections, each section including an inner wall corresponding in shape to one-half of the outline of the ball to be treated, an outer wall spaced from said inner wall and defining a heating chamber completely surrounding said inner wall, inlet conduits connecting with said sections, outlet conduits connecting with said sections, and a heat generating source, the opposite ends of both series of said conduits connecting with said heat generating source.

BENJAMIN KOZMER.